United States Patent [19]

Ivanoff

[11] 3,715,034
[45] Feb. 6, 1973

[54] DEVICE FOR REMOVING OIL SLICKS
[76] Inventor: Alexander Ivanoff, 20 Brookside Drive, Greenwich, Conn.
[22] Filed: May 6, 1970
[21] Appl. No.: 35,154

[52] U.S. Cl. ............................210/242, 210/DIG. 21
[51] Int. Cl. ...............................................C02b 9/02
[58] Field of Search.........210/83, 242, 523, DIG. 21, 210/154

[56] References Cited

UNITED STATES PATENTS

| | | |
|---|---|---|
| 3,465,882 | 9/1969 | Bowersox............................210/154 |
| 2,876,903 | 3/1959 | Lee .....................................210/242 |
| 3,476,038 | 11/1969 | Dicmas............................210/242 X |
| 3,523,611 | 8/1970 | Fitzgerald............................210/242 |
| 1,591,024 | 7/1926 | Dodge................................210/242 |
| 3,615,017 | 10/1971 | Valdrspino ...................210/DIG. 21 |

FOREIGN PATENTS OR APPLICATIONS

| | | |
|---|---|---|
| 308,940 | 3/1933 | Italy ...................................210/242 |
| 947,026 | 1/1964 | Great Britain.......................210/242 |
| 577,126 | 5/1958 | Italy ...................................210/242 |

*Primary Examiner*—Reuben Friedman
*Assistant Examiner*—T. A. Granger
*Attorney*—Hane, Baxley & Spiecens

[57] ABSTRACT

Oil floating on a body of water is collected by moving a shallow-draft water craft, such as a barge, having a sternwardly slanted bow section and below the water line an ingress opening in or near the bow section through an oil slick. The slant of the bow section forces oil in its path downwardly thereby causing the oil, possibly intermingled with water, to flow as a flat layer along the bottom of the barge. As the oil reaches the ingress opening it is propelled into a hold of the barge due to the pressure differential between the outside and the inside of the barge. Oil thus accumulating in a hold of the barge may be removed therefrom from time to time and clear water as may also enter the hold is returned to the body of water.

12 Claims, 23 Drawing Figures

INVENTOR.
ALEXANDER IVANOFF
BY
Horne, Baxley and Spiers
ATTORNEYS

INVENTOR.
ALEXANDER IVANOFF
ATTORNEYS

INVENTOR.
ALEXANDER IVANOFF
BY
Horne, Baxley and Spiecens
ATTORNEYS

DEVICE FOR REMOVING OIL SLICKS

The invention relates to means for removing oil floating as an oil slick on a body of water.

BACKGROUND

In recent years the environmental problems created by often massive oil slicks have come to the forefront of public concern. Such oil slicks may be caused by damaged or sunken oil tankers, or by oil escaping from runaway off-shore oil wells.

A widely used method of collecting floating oil, preferably before it comes in contact with the shore, is sopping it up by means of straw mats. This method is obviously cumbersome and extremely time-consuming; it is not practical for large oil slicks. Several methods of removing oil slicks by chemical means have also been proposed. Different types of dispersants are used. Such dispersants will cause the oil slick to break up and the oil to sink to the bottom together with the dispersant. While such dispersants remove the oil from the surface of the water, the accumulations of oil and dispersants on the bottom have been found to be harmful and often lethal to marine life, the more so as oil slicks often occur in fairly shallow water — that is, within the range of the continental shelf. Moreover, all means and methods as heretofore known lose their effectiveness rapidly in a rough sea.

THE INVENTION

I have found that when a suitably designed water craft is moved through water covered with oil, the oil in the path of the craft will not be split by the bow of the craft and flow along the sides of the hull, but will be deflected downwardly and flow as a substantially flat layer along the bottom of the craft. Ideally this layer is a continuous layer of oil only, but I have observed that in actual practice the layer is likely to be intermingled with water. However, even such mixture will behave as previously described, that is, it will flow as a substantially flat layer.

Due to the inherently existing pressure differential between the liquid in the layer flowing along the bottom of the craft, be it oil or oil intermingled with water, and the inside of the craft, the oil making up the layer will be forced at least to a substantial extent into the craft if an opening is provided in the flow path of the layer, thus making unnecessary the use of pumps for drawing the oil into a hold of the craft.

Broadly, my inventive concept resides in providing a water craft capable of utilizing the afore-discussed phenomena for collecting oil floating on the water.

Accordingly, it is a broad object of my invention to provide a novel and improved water craft which when moving through an oil slick imposes upon oil in its path a downwardly directed force causing the oil to flow as a layer along the bottom of the water craft, and which includes means diverting at least a substantial part of this layer consisting of oil only or oil intermingled with water into a hold of the water craft.

Another important object of the invention is to provide a novel and improved water craft, the bow section of which has a configuration such that oil in the path of the craft is not or at the most only partly divided but forced to flow as a substantially flat layer along the bottom of the craft, and which includes means for scooping up at least a substantial portion of the oil making up this layer and for discharging water scooped up together with the oil from the water craft.

Still another important object of my invention is to provide a novel and improved water craft which has in or adjacent to its bow section below the water line a crosswise ingress opening for oil and water intermingled therewith, if any, and which is equipped with means for closing the opening when not needed, for instance, when the craft is moving through clear water.

A further important object of my invention is to provide a novel and improved water craft including means for impeding surging of oil accumulated in the craft and for controlling the trim of the craft as the same is being gradually filled with oil.

It is also an important object of my invention to provide a novel and improved water craft which when moving through an oil slick channels oil between side walls of the craft and toward a stern wall near which the collected oil may be pumped out.

SUMMARY OF THE INVENTION

The aforepointed out objects, features and advantages and other objects, features and advantages which will be pointed out hereinafter are obtained by providing a water craft which has a broad or substantially squared-off bow section sternwardly slanted from the deck toward the water line and a substantially flat bottom, and which further has below the water line in or near the bow section a transverse elongate opening for the ingress of the oil flowing as a substantially continuous layer along the bottom of the craft when the same is moving through the water. The craft is further equipped with openings, preferably near the stern of the craft for discharging water which may have entered the craft together with scooped-up oil. As is evident, the oil within the hold of the craft will automatically constitute the top layer of the liquid in the craft so that the water can be drained from the bottom.

Water craft such as barges and scows can be readily and inexpensively adapted for the purpose of the invention as they generally have a squared-off slanted bow section and a flat bottom.

A craft used for the purpose of the invention can be self-propelled or be pulled or pushed by tugs.

DETAILED DESCRIPTION OF THE INVENTION

In the accompanying drawing, several preferred embodiments of the invention are shown by way of illustration and not by way of limitation.

Figure 1:
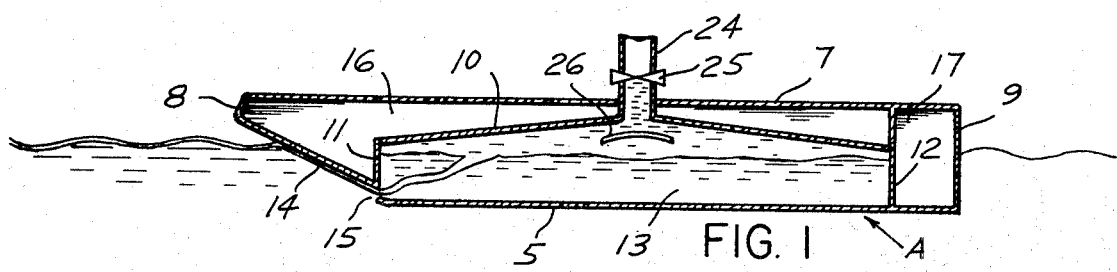
FIG. 1 is a diagrammatic lengthwise sectional view of a water craft such as a barge equipped with means for collecting oil floating on a body of water in accordance with the invention.

Referring now to the figures more in detail, and first to FIG. 1, this figure exemplifies a water craft A, shown as a shallow-draft barge or scow which may be moved through the water by its own power plant or by a separate tug. The power means required for moving the barge do not constitute part of the invention and are hence not shown or described. The hull of the barge has a flat bottom 5, substantially vertical sides 6, deck plates 7, a bow section 8 and a stern section 9. A middle deck 10, below deck 7, in conjunction with a forward bulkhead 11, a stern bulkhead 12 and bottom 5 define a hold 13 for accumulating therein oil and water.

Bow section 8 (see also FIG. 4) is formed by plates 14 which extend across the width of the substantially squared bow and are sternwardly slanted from the deck toward the bottom of the hull. A slot 15 extending preferably across the entire width of the bow section is provided in the area in which the slanted plates 14 join the bottom plates 5, but the slot may also be located in the bottom plates themselves near the bow section.

An enclosed flotation chamber 16 in the bow and midship of the barge and a stern flotation chamber 17 are provided to assure flotation of the barge as the hold 13 thereof becomes filled.

A suction pipe 24 including a control valve 25 serves to pump out oil accumulated in hold 13. As has been previously stated and as is also evident, oil will accumulate in the hold as the top layer of liquid therein. Accordingly, a pump connected to pipe 24 will pump out primarily oil. However, I have found that when the oil layer becomes relatively thin the suction created at the intake end of pipe 24 during pumping will cause the oil/water interface to bulge upwardly and to enter the suction pipe so that water is pumped out at the same time as oil, which is of course undesirable. A baffle plate 26 below the intake opening of the pipe inhibits effectively such bulging. The plate is preferably somewhat concavely curved relative to the pipe intake to provide a more streamlined entrance and to lower the inflow velocity at the periphery of the plate.

When a water craft as shown in FIG. 1 moves through the water — according to my present tests speeds of about 5-10 knots are suitable — oil in the path of the bow will not or only to a small part be sidewardly pushed and flow past the sides of the hull, but be forced downwardly and flow as a substantially continuous layer along the bottom plates 5. If the water surface is rough the floating oil layer will be broken up and as a result the layer will not be a continuous layer of oil, but a layer intermingled with water; nevertheless, there will be a continuous flow of a layer containing oil downwardly along plates 14 and then along bottom plates 5.

As the flow of the layer passes ingress slot 15 at least a substantial part of the oil contained in the layer, and if present also a substantial part of water intermingled with the oil, will be forced to pass through the slot and thus into hold 13 due to the differential pressure between the liquid outside of the hull and the pressure in the hold. As a result, oil rapidly collects within the hold. As most of the flat wall along which the oil flows before reaching slot 15 constitutes a region where the dynamic pressure is positive with respect to the undisturbed water, oil entering the hold through the slot can rise to a higher level than the water level outside — thus permitting a higher loading of the barge.

Figure 4:
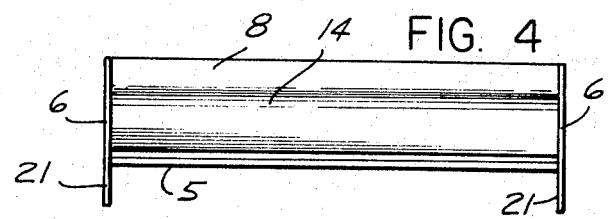
FIG. 4 is an end view taken on line 4—4 of FIG. 3.

Tests have shown that extension of the side walls of the hull below bottom 5 as it is shown in FIG. 4 at 21, considerably increases the volume of liquid propelled into the hold through slot 15 as the elongated side walls 21 channel the oil in the path of the bow section toward the slot — or in other words, impede sidewise escape of the oil.

Figure 2:
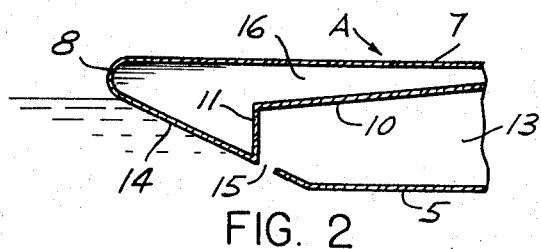
FIG. 2 is a lengthwise sectional view of a modification of the bow section of the barge shown in FIG. 1.

FIG. 2 shows a somewhat different configuration of the bow section. The function of the embodiment of FIG. 2 will be obvious from the previous description.

Figure 3:
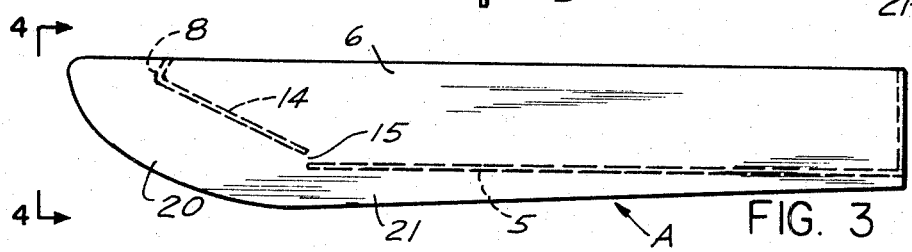
FIG. 3 is a diagrammatic fragmentary view of a barge equipped with means for increasing the layer-forming efficiency of the barge.

FIG. 3 shows a structure in which the channeling effect of downwardly extended side walls 21 is carried further by extending the channeling walls not only below the level of bottom 5 but also forward at the bow section. As is evident, any oil captured between extended bow plates 20 cannot escape sidewardly but is forced to flow downwardly by slanted bow plates 14 and thus will eventually enter slot 15.

Figure 5:
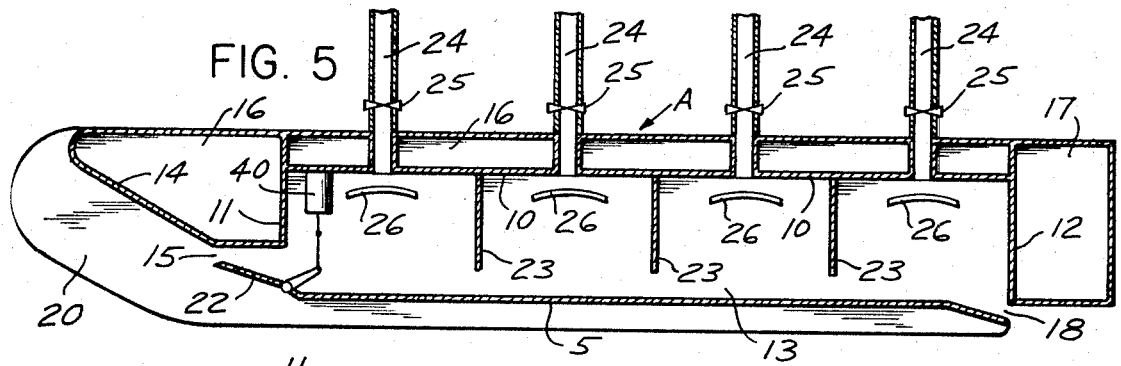
FIG. 5 is a diagrammatic lengthwise sectional view of a modification of a barge equipped in accordance with the invention.

FIG. 5 shows a barge equipped with oil-collecting means as previously described, except that the hold 13 of FIG. 1 is divided by vertical plates 23 into a number of communicating compartments. Such compartmentilization of the hold is particularly important when the hold has a high capacity as the movements of a large volume of liquid in the hold due to the movements of the water craft may seriously affect the trim and the safety of the craft. The subdivisions as effected by vertical plates 23 break up and thus minimize surging of liquid accumulated in the hold. Each of the compartments may be equipped with a suction pipe 24 and a baffle plate 26, as previously described.

The embodiment of FIG. 5 provides that water which has entered the hold together with oil is returned to the sea or other body of water by flowing out through one or several exit openings 18 near the stern of the barge. As is evident, water will flow out until the liquid level in the hold and outside the hold are equalized. In fact, due to suction action the inside water level may be lower than the outside water level as long as the barge moves through the water above a minimum speed.

The barge of FIG. 5 is further equipped with a pivotal closure 22, the position of which is controlled, for instance, by a suitable and conventional servomechanism diagrammatically indicated at 40.

Closure 22 is kept open when and while the barge is engaged in collecting oil and is closed when the barge is moving through clear water or filled to capacity with oil.

Figure 6:
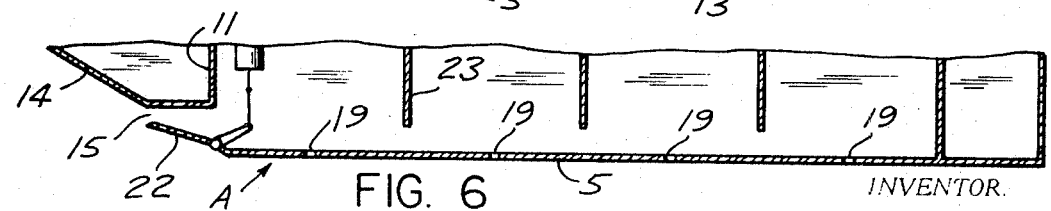
FIG. 6 is a fragmentary view of a barge showing a modification of the means for discharging clear water scooped up together with oil from the barge.

FIG. 6 is similar to FIG. 5, except that discharge of water is effected through one or more bottom openings 19.

Figure 7:
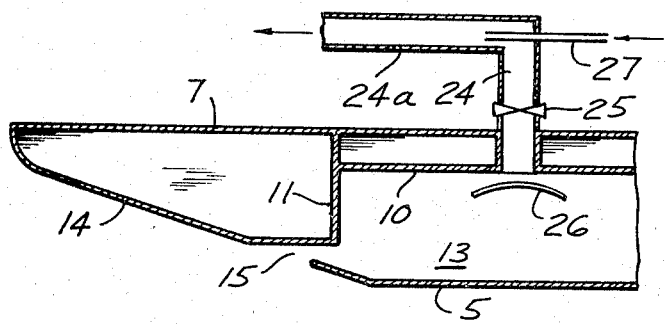
FIG. 7 is a fragmentary lengthwise sectional view of the forward section of a barge similar to the barge shown in FIG. 1 and equipped with means for removing accumulated oil from a hold of the barge.

FIG. 7 shows means for pumping oil out of hold 13 in an efficient and convenient manner. Pipe 24 is continued by a pipe 24a which is part of a jet pump or ejector. Pipe 24a should be visualized as being connected to an oil tank of a standing-by tanker or also to an oil tank on the barge itself. The pumping action is obtained by driving a high velocity stream of liquid through a pipe 27. This liquid may be water or oil and the necessary force may be supplied by a power plant of the barge itself or of a stand-by ship.

Figure 8:
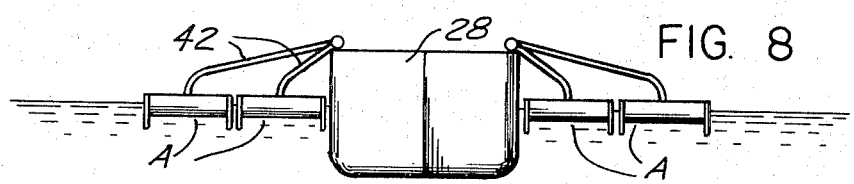
FIG. 8 is a diagrammatic view upon the bow section of a tanker to which are rafted oil-collecting barges according to the invention.

FIG. 8 shows an arrangement designed for rapidly collecting oil from a large oil slick. A mother ship such as a tanker 28 has rafted thereto, preferably on both sides, several barges A, for instance of the type shown in FIG. 1. The suction pipe of each of the barges is connected by pipes 42 to the holds of the mother ship.

The oil-containing compartment or compartments (see FIG. 5) of the barge are generally filled with oil, possibly intermingled with water close up to the level of the deck forming the roof of the compartment. Such complete filling with liquid prevents formation of an air-entraining vortex inside the hold or a compartment during pumping. As is known, such vortex would interfere with smooth pumping.

The shape of wall 14 of the bow section is selected in accordance with the specific properties which are desired. A sloped, substantially bow wall as shown for instance in FIGS. 1 and 5, is easy and inexpensive to manufacture and it is stable in rough seas. However, the dynamic pressure forcing the downward movement of oil in its path is not as high as it is in some other forms of the bow. This can be compensated for by propelling the barge at a comparatively high speed, but high speed increases costs and is not always possible, for instance within a harbor where oil slicks frequently occur. As previously pointed out, a flat bow wall has the advantage that most of it constitutes a region where the dynamic pressure is positive with respect to the undisturbed water. As a result, oil entering the hold of the barge through the slot in the hull thereof can rise to a higher level than the outside water level.

A curved forward bow wall creates a larger differential pressure than a slanted flat bow wall because, in addition to a positive pressure on the front part of the bow wall there is also a negative pressure further aft, and, of course, also deeper down. The exact pressure differential which is attainable depends upon the Reynolds number for the barge, but it is likely to be twice greater than that of a flat sloping bow wall. This has the advantage that a comparatively low speed of the barge is sufficient for collecting oil, but it also means that if the slot is in the region of negative pressure the oil entering the barge cannot rise to a level as high as the water outside.

Figure 9:
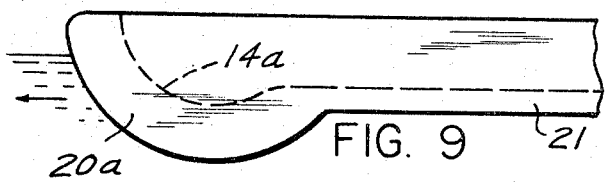
FIGS. 9 and 10 show diagrammatically modifications of bow sections of a barge.

A generally cylindrically curved bow wall is shown in FIG. 9 at 14a. The extended bow wall plates must of course be similarly curved, as it is indicated at 20a.

With a cylindrically curved surface the dynamic pressure varies with the depth below the water surface in a substantially straight line relation, while with a wedge-shaped surface as shown, for instance in FIG. 1, the change in pressure with depth is represented by a curve.

Figure 10:
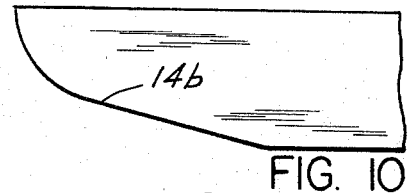

FIG. 10 shows a bow outline which is a good compromise between a cylindrical curvature and a flat bow shape, as it is indicated at 14b.

A further factor to be taken into consideration is that the outline of the bow should be designed for rapid changes in the depths of submergence as are caused by waves.

While the general design of a barge or scow is preferred for carrying out the concept of the invention, the invention is not limited to this type of water craft. For instance, the water craft may have the shape of a cylinder or of a half-cylinder towed broadside on and provided with scoops or slots and also channeling side plates.

Figure 11:
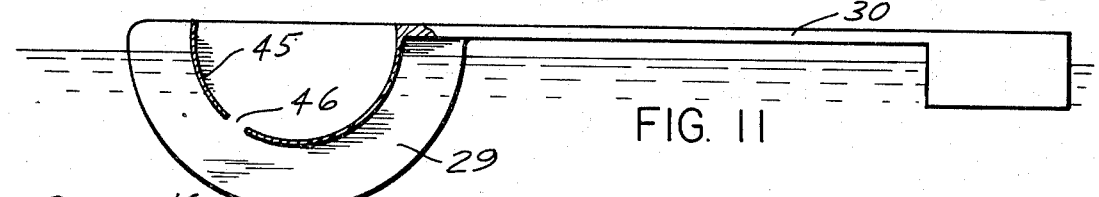
FIGS. 11, 12 and 13 show diagrammatically lengthwise sectional views of different hull shapes of barges equipped with oil-collecting means according to the invention.

FIG. 11 shows a structure of this type; the oil collecting section of the ship is shown as a semi-cylinder 45 having in its wall below the water surface a lengthwise elongate ingress slot 46. To assure stability of the water craft the semi-cylindrical body 45 is fitted at its stern with an outrigger 30. Oil channeling flanges or keels 29 are preferably provided, similar to the previously described extensions 20.

An oil-collection section of elliptical cross-section may, of course, also be used.

Figure 12:
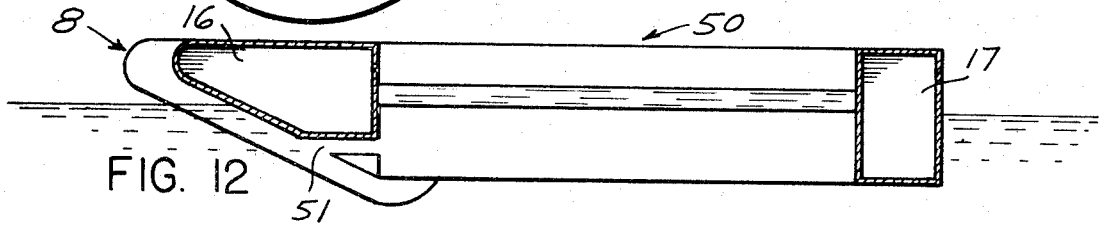

According to FIG. 12, the water craft aft of bow section 8 is in the form of a floating box 50 open at the top and the bottom. The oil passing under the bow directly or through a slot 51 of the kind described will enter the box in which it separates itself from the water by floating to the surface. The oil thus accumulated within the box can be pumped out therefrom or otherwise removed when it has reached a suitable thickness. A water craft of this type has the advantage that it does not need trimming as the barge is being filled since it will automatically trim itself due to the open box. There is also no need to remove the water entering intermingled with the oil as it will flow out automatically through the open bottom of the box.

Figure 13:
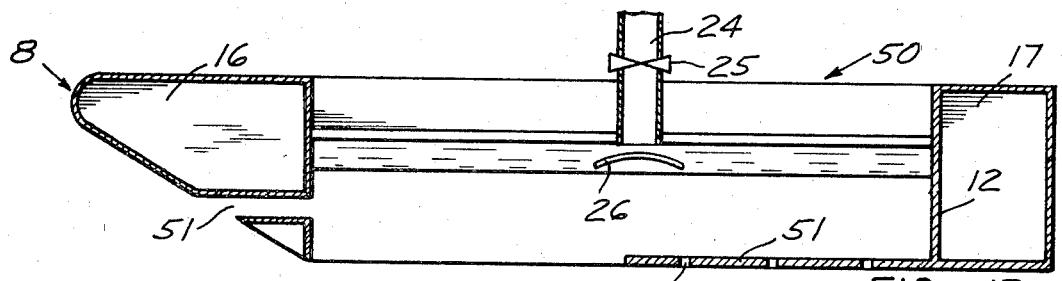

The water craft of FIG. 13 is similar in principle to the barge type shown in FIG. 12 except that the bottom of box 50 is partly closed by a wall 51, thereby reducing agitation of the liquid within the box by the relative motion of the water outside of it. The partial bottom preferably has a number of perforations 51a to avoid large differential pressures as may exist at the face of aft bulkhead 12. Such differential pressure may cause some of the oil held in the box to pass out below the flotation chamber 17. The liquid within the box can be further calmed and the escape of oil to the outside can be impeded by extending the side walls of the box and aft bulkhead 12 to a greater depth than the bow portion.

Figure 14:
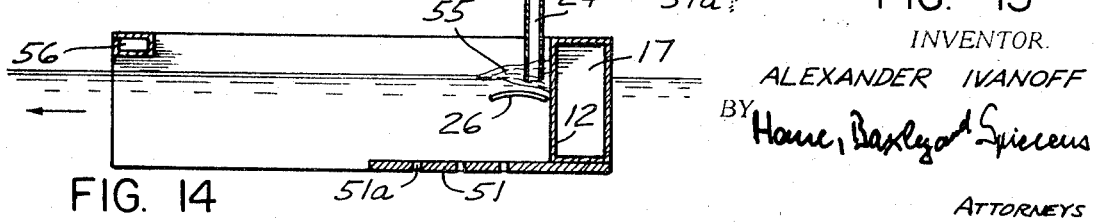
FIG. 14 shows diagrammatically a lengthwise sectional view of another type of water craft also equipped with oil-collecting means according to the invention.

According to FIG. 14, the water craft is in the form of an open boom pushed in the direction shown in the figure by an arrow. The oil in the path of the boom will freely enter the open forward end thereof and when encountering wall 12 of flotation compartment 17 it will automatically thicken and assume the form of an acute wedge, as it is indicated at 55. The oil may be sucked out at this point by means of suction pipe 24 in the manner previously described. Cross-beams 56 may be provided to give more seaworthiness and support to the boom as it is propelled through the water.

Figure 15:
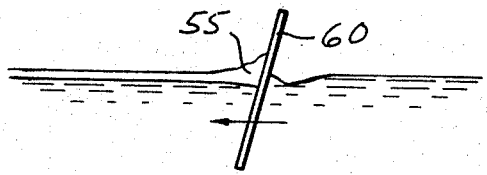
FIG. 15 shows diagrammatically the changes experienced by a liquid flow when impacting upon a slanted wall placed in the flow.

It has been found that the thickness of the oil wedge as formed when the oil is stopped by a wall can be increased by backwardly slanting such wall. Obviously, thickening of the oil layer in front of the wall improves the efficiency of the operation. FIG. 15 shows a slanted wall 60 which should be visualized as being moved in the direction of the arrow in the position in which it is shown. Tests have shown that a flat plate or wall thus inclined does not cause a downward flow of the oil as does a wall oppositely slanted as shown, for instance in FIG. 1, but a very marked thickening of the oil as it is indicated at 55. A slant angle as small as 10° has been found to be sufficient.

Figure 16:
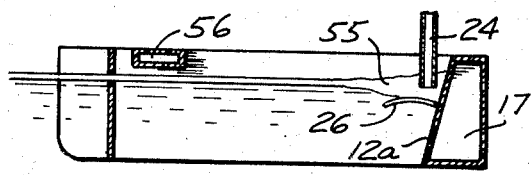
FIG. 16 is a lengthwise diagrammatic view of part of a barge or other water craft utilizing the flow changing effect of the wall shown in FIG. 15.

FIG. 16 shows an open boom-type water craft in which the wall 12a of flotation chamber 17 is slanted in the manner of wall or plate 60. Oil is sucked out by means of pipe 24 adjacent to the upper end of the wall, that is, at an area where the oil is thickest. Obviously, a downward flow of oil would be undesirable with the structure of FIG. 16.

Figure 17:
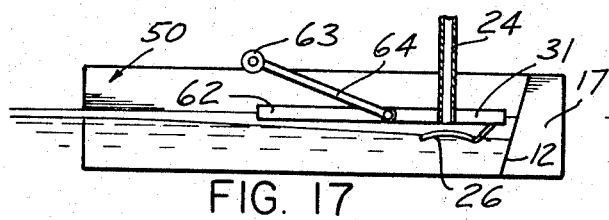
FIG. 17 shows diagrammatically means for pumping out oil and constraining the movements of oil and water accumulated in a hold of the barge.
Figure 19:
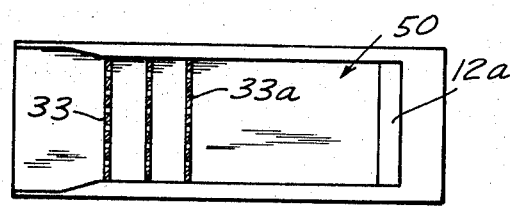
FIG. 19 is a plan view upon a water craft such as a barge equipped with means for restricting movement of oil and possibly water accumulated in a hold of the barge.

An open or substantially open box barge, that is, a barge as previously described and seen in plan view in FIG. 19, is likely to exhibit more up and down movements in rough water, than a barge of the type shown in FIGS. 1 or 5. Such movements will cause oil collected within the box 50 to move up and down relative to the side walls of the barge, and this may cause pumping difficulties. To calm oil collected in box 50 and thus to facilitate pumping of the oil, a floating deck 62 may be provided, as is shown in FIG. 17. This deck which is pivotal about a pivot 63 to which it is hinged by a linkage 64, rests on the surface of the oil and supports suction pipe 24 or an ejector pump, as shown in FIG. 7. As a result, the suction pipe will move up and down with the floating deck as the oil moves, so that there is no interference with the pumping.

Figure 18:
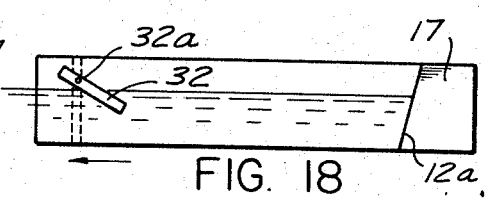
FIG. 18 is a diagrammatic lengthwise fragmentary view of a further modification of a water craft of the type shown in FIG. 16.

Referring to FIG. 18, this figure shows an open-fronted box barge, which has a front wall or gate 32 pivotal about a pivot axis 32a located above the middle of the gate. This gate will automatically swing into the open position when the box barge is moving in the direction of the arrow and swing shut when the forward motion ceases. It is of course possible to open and close the gate by a power means.

FIG. 19 shows an open-fronted box barge which is stabilized in the water by reducing the wave motions within box 50 by providing one or more partitions 33 including perforations 33A. Obviously, these partitions will reduce but not block movements of liquid within the box.

Partition walls as shown in FIG. 19 can of course be used in all the aforedescribed open-fronted box barges.

Figure 20:
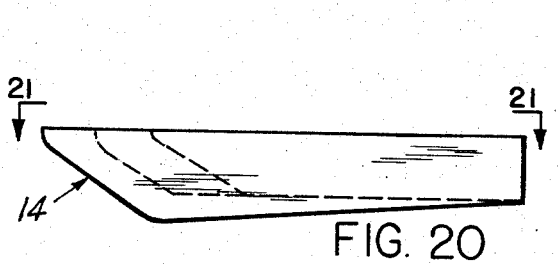
FIGS. 20 to 23 inclusive are diagrammatic side and plan views, respectively, of different bow designs of a barge or other water craft for collecting oil.
Figures 21, 22:
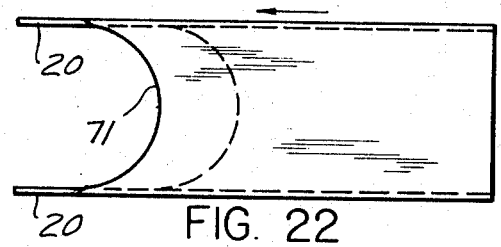

FIGS. 20 and 21 show a bow section shaped in the form of a Vee 70 as seen in the direction of motion of the barge. Because water and oil meeting the sides of the Vee are deflected somewhat toward the apex area of the Vee, the velocity of oil and water is highest at the apex area of the Vee. As a result, the aforedescribed formation of a layer will occur at least below the apex area at a lower speed of the barge than if the bow has the flat shape of wall 14 as shown in FIG. 1. Accordingly, the barge of FIGS. 20 and 21 can be operated at a lower speed than the barge of FIG. 1. On the basis of the present tests, the apex angle of the Vee may be between 90°–120°.

A similar effect can be obtained by giving the bow wall 71 the curved configuration shown in FIG. 22. With such curved bow wall the oil impacts upon a concave curvature (circular, elliptic or parabolic), which concentrates the oil toward the mid-portion of the wall.

Figure 23:
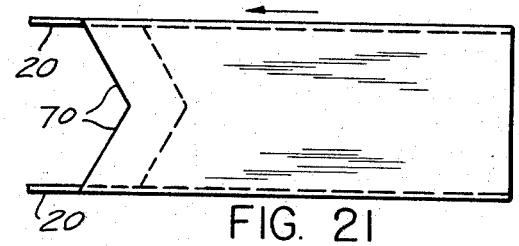

Instead of one Vee as shown in FIG. 21, several Vees can also be combined, as it is shown at 72 in FIG. 23.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. A means for collecting oil floating on a body of water, said means comprising:

a vessel with a bottom, sidewalls, a bow and a stern and adapted to float on the surface of a body of water, a hold within said vessel defined by said bottom, sidewalls, bow and stern, the bow of said vessel comprising a portion including a surface area forwardly inclined in the bow direction and extending between said sidewalls and with a top edge and a bottom edge extending respectively above and beneath the surface of said body of water, horizontally elongate opening means in said bow surface leading into said hold within said vessel, whereby with forward motion of the vessel oil in the path of said inclined bow surface area is deflected downwardly by the inclined bow surface area and caused to flow in the form of a layer along said bow portion and the bottom of the vessel and the pressure differential between the inside and outside of the vessel causes at least a substantial part of the oil contained in said layer to flow into said hold through said opening means.

2. The means according to claim 1 wherein said opening means comprise an elongate slot horizontally extending across substantially the width of the vessel.

3. The means according to claim 1 wherein said forwardly inclined surface area is a flat wall portion including said opening means.

4. The means according to claim 1 wherein said bottom is a flat bottom.

5. The means according to claim 1 wherein side walls of said bow are downwardly extended below the water line, said extensions forming fins for channeling oil toward said opening means.

6. The means according to claim 5 wherein the sides are extended below the bottom.

7. The means according to claim 1 wherein at least one closed flotation chamber for controlling the trim of the craft and increasing the buoyancy thereof is provided within said hold.

8. The means according to claim 1 wherein pump means extend into said hold for sucking off oil entering the hold through said opening means and forming a top layer in the hold.

9. The means according to claim 8 wherein said bottom includes at least one opening for draining water as may accumulate in the hold as a bottom layer.

10. The means according to claim 1 wherein at least one partition wall divides said hold into communicating compartments for impeding surging of oil and water accumulated in the hold.

11. The means according to claim 1 and comprising a closure member movable into and out of a position closing said opening means for selectively opening and closing the same.

12. A means for collecting oil floating on a body of water, said means comprising:
- at least two vessels as defined in claim 1;
- a mother ship;
- means for rafting said vessels to the sides of the mother ship for movement in unison therewith; and
- conduits connecting the interior of the hulls of said vessels for transferring oil collected in said hulls to the mother ship.

* * * * *